United States Patent [19]
Montenegro et al.

[11] Patent Number: 5,619,645
[45] Date of Patent: Apr. 8, 1997

[54] SYSTEM ISOLATION AND FAST-FAIL

[75] Inventors: Gabriel E. Montenegro, Fremont; Steven J. Drach, San Francisco; Ho Y. Wong, Sunnyvale, all of Calif.

[73] Assignee: Sun Microsystems, Inc., Mountain View, Calif.

[21] Appl. No.: 418,830

[22] Filed: Apr. 7, 1995

[51] Int. Cl.⁶ .................................................. G06F 11/00
[52] U.S. Cl. ................... 395/185.01; 395/184.01
[58] Field of Search ...................... 395/182.02, 183.19, 395/185.01, 800, 185.08, 184.01, 185.02; 371/20.1; 370/60.1, 94.1; 364/242.96

[56] References Cited

U.S. PATENT DOCUMENTS

| | | | |
|---|---|---|---|
| 5,049,873 | 9/1991 | Robins et al. | 340/825.06 |
| 5,142,622 | 8/1992 | Owens | 395/200 |
| 5,157,667 | 10/1992 | Carusone, Jr. et al. | 371/29.1 |
| 5,185,860 | 2/1993 | Wu | 395/200 |
| 5,428,619 | 6/1995 | Schwartz et al. | 371/20.1 |
| 5,436,909 | 7/1995 | Dev et al. | 371/20.1 |

OTHER PUBLICATIONS

Matta et al., "Type of Service Routing in Dynamic Datagram Networks", 1994 IEEE, pp. 992–999.

Simmons et al., "Knowledge Sharing between Distributed Knowledge Based Systems", 1992, IEEE, pp. 701–704.

*Primary Examiner*—Robert W. Beausoliel, Jr.
*Assistant Examiner*—Norman M. Wright
*Attorney, Agent, or Firm*—Blakely, Sokoloff, Taylor & Zafman

[57] ABSTRACT

A method and an apparatus allowing a system interfaced with a network to continue functioning in a diminished capacity, even when the system is temporarily disconnected from the network. Unmodified applications running on the system which initiate a network-related operation during system isolation are coerced into a fast-fail behavior by fast-fail mechanisms residing in the system's network layer kernel modules.

25 Claims, 12 Drawing Sheets

SYSTEM ISOLATION AND FAST-FAIL

BACKGROUND OF THE INVENTION

(1.) Field of the Invention

The present invention relates to the field of network operations. More particularly, this invention relates to a method and an apparatus for automatically enabling a system to continue to function in a diminished capacity when disconnected from a network.

(2.) Prior Art

Typically, today's computing environments consist of a core cluster of servers and many desktop workstations. In addition, an increasing number of personal computers (PC's) are now on a network and have become part of a distributed system. This has led to a number of work stations and PC's implementing a client server model of a system of decentralized distributed processing which depends on a functional network for successful operation.

One problem which arises if a network operation fails is that the system interfaced with the network is often rendered unusable. Usually, this unusable state is a temporary condition. One known recovery procedure is to periodically retry the failed network operation until conditions improve. Some network clients, however, ignore a network failure and retry forever, effectively preventing themselves from continuing to operate even in a diminished capacity. Further, in some cases, the system appears to hang or freeze during a period of disconnection.

Another approach to solving the problem is to modify existing services and applications so that they have more information regarding network status. Once these services and applications have more information, they become more aware of the characteristics of the underlying communications medium. This approach is very expensive and time consuming.

Figure 1A:
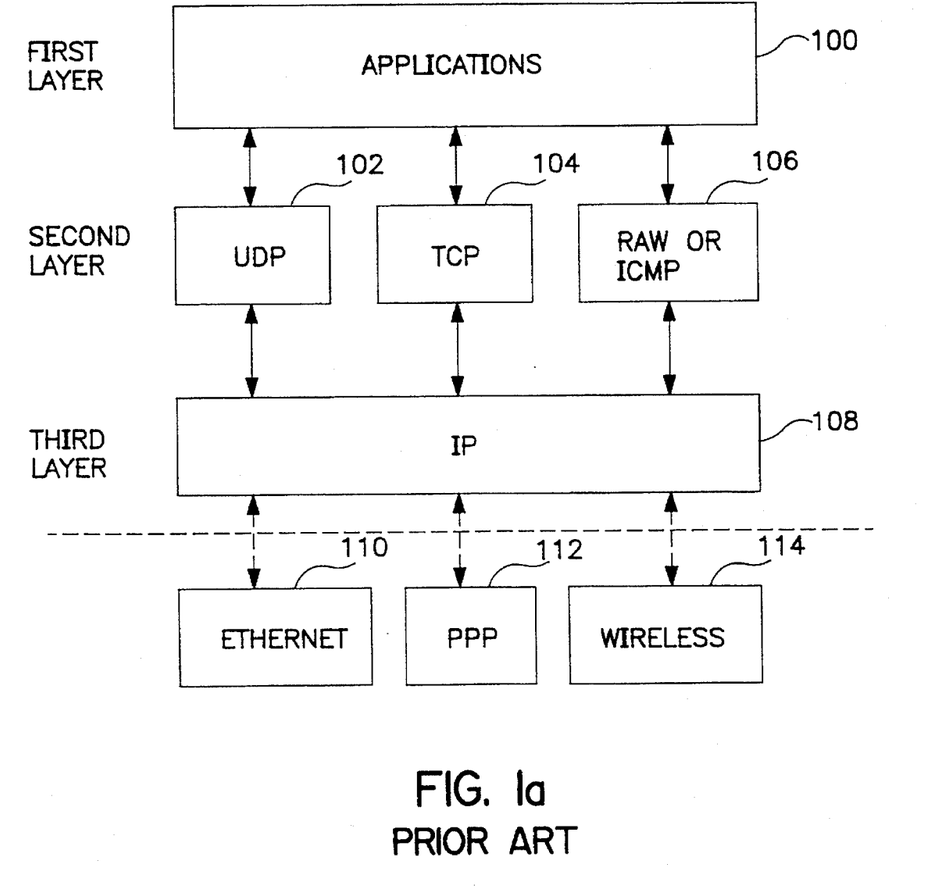
FIG. 1a illustrates networking layers which may reside in the memory of a system which is part of a distributed network.
Figure 1B:
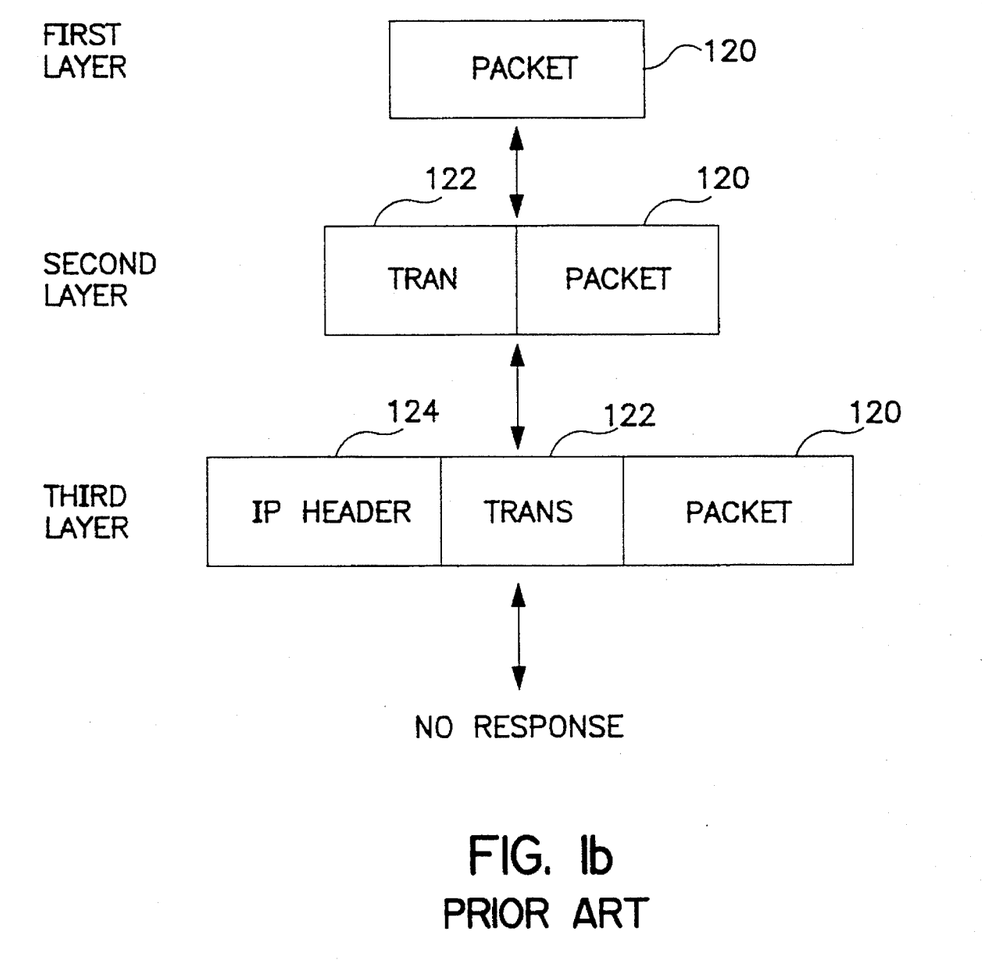

FIG. 1a illustrates an exemplary network layer residing in the memory of a system coupled to a network. FIG. 1b is a data flow diagram illustrating the flow of an outgoing data packet originating from an application running on the system. If the system is disconnected from the network and an outgoing data packet has been generated, a system with a prior art method and apparatus as illustrated by FIGS. 1a and 1b will typically disallow a user from continuing with normal operation of the system until the network connection is up again.

The networking layer illustrated in FIG. 1a is based on TCP/IP (Transmission Control Protocol/Internet Protocol) implementation. TCP/IP is a set of communication protocols which support peer-to-peer connectivity functions for both local and wide area networks.

The top layer includes applications 100 running on the system. The second layer includes a transport layer, which in a TCP/IP implementation may be comprised of UDP (user datagram protocol) 102, TCP (Transmission Control Protocol) 104 and ICMP (Internet Control Message Protocol) 106. UDP 102 on top of TCP/IP is a packet-level protocol built directly on IP 108 and is typically used for application-to-application communication between TCP/IP host systems. TCP 104 is a communications protocol typically used in Internet and in any network which follows the U.S. Department of Defense Standards for Inter-Network Protocol. TCP 104 provides a reliable host-to-host protocol between hosts in packet-switched communications networks and in interconnected systems of such networks. Further, TCP 104 assumes that IP 108 is the underlying protocol. ICMP (Internet Control Message Protocol) 106 is a protocol used to communicate with a source host, for example, to report an error in a datagram and is an integral part of a typical IP 108.

The next layer is the Internet layer, which is made up of IP (Internet Protocol) 108 and allows the user to create internets. IP 108 is a protocol used to route data from a source to its destination in an Internet environment.

Beneath the network layer are exemplary networking drivers which allow IP 108 to transmit and receive packets, and include ethernet 110, PPP (Point-to-Point Protocol) 112 and wireless 114. PPP 112 is typically used for serial devices including phone lines, synchronous dedicated lines, and ISDN (Integrated Services Digital Network). Ethernet 110 is typically a 10-megabit base band local area network which allows multiple stations to access a transmission medium at will without prior coordination. Ethernet 110 avoids contention by using carrier sense and deference, and resolves contention by using collision detection and transmission. The networking layers illustrated in FIG. 1a are typical in a standard network layer and are well known in the art. When an outgoing packet addressed to a network is transmitted and the network connection is down, a user is disallowed from continuing normal operation of the system. Further, the network layer illustrated does not have any facilities to overcome this problem.

FIG. 1b illustrates an exemplary transmission of packet 120 through the networking layers illustrated in FIG. 1a. A packet in TCP/IP is the unit of data passed across the interface between the Internet (IP) layer and the link layer (i.e. the layer with the earlier mentioned drivers, Ethernet 110, PPP 112, etc.). A packet typically includes an IP header and data and may be a complete IP datagram or a fragment of an IP datagram. A datagram contains a source and destination address along with the data. In the second layer (as illustrated in FIG. 1a), packet 120 is encapsulated by transport header 122. In the third layer (as illustrated in FIG. 1a), IP header 124 is combined with transport header 122 and packet 120. In a typical disconnect situation where a system interfaced with a network has no available interfaces, no response is transmitted back to the system. A typical system will then either hang, or will retry to connect with the network, disallowing a user of the system to continue with normal operation.

It is desirable to have a method and an apparatus that allows for continued functionality even when a system interfaced with a network is temporarily disconnected from the network.

BRIEF SUMMARY OF THE INVENTION

A method and an apparatus for providing a fast-fail capability to a system interfaced with a network is disclosed. The present invention allows network operations that are certain to fail, to do so quickly when a system is disconnected from a network to prevent the system from hanging. With the present invention, instead of waiting for network operations to resume subsequent to a network disconnection, a system may continue operating using whatever local resources that are available.

The present invention's fast-fail capability prevents the system from freezing or retrying network operations when the system is isolated. System isolation describes a condition where no network access is possible by the system. Typically, system isolation often occurs when a time-out is on the order of minutes or hours.

With the present invention, instead of waiting for a reply from their server, network clients receive a notification that they are isolated from the network. This system isolation allows the network clients to fail the operation involved with the network instead of making futile attempts at retrying the network connection. System isolation may be enabled by either direct user input requesting system level isolation or implicitly when all (except for loop-back) interfaces are down or unusable. There are no futile attempts to retry the failed network operation. With the present invention, network clients may also make use of local caches or recording network operations to be replayed upon notification that they are isolated from the network.

The present invention also provides a mechanism for developing applications and kernel modules which modify their behavior during a network disconnection. Since the fast-fail capability of the present invention provides the applications interfaced with a network with immediate and unequivocal indication of a network disconnection, these applications have no need to implement private modules to determine the state of network connections.

BRIEF DESCRIPTION OF THE DRAWINGS

FIG. 1b illustrates an exemplary transmission of packet 120 through the networking layers illustrated in FIG. 1a.

DETAILED DESCRIPTION OF THE INVENTION

The method and apparatus of the present invention allows a system interfaced with a network to continue functioning in a diminished capacity, even when the system is temporarily disconnected from the network.

Figure 2:
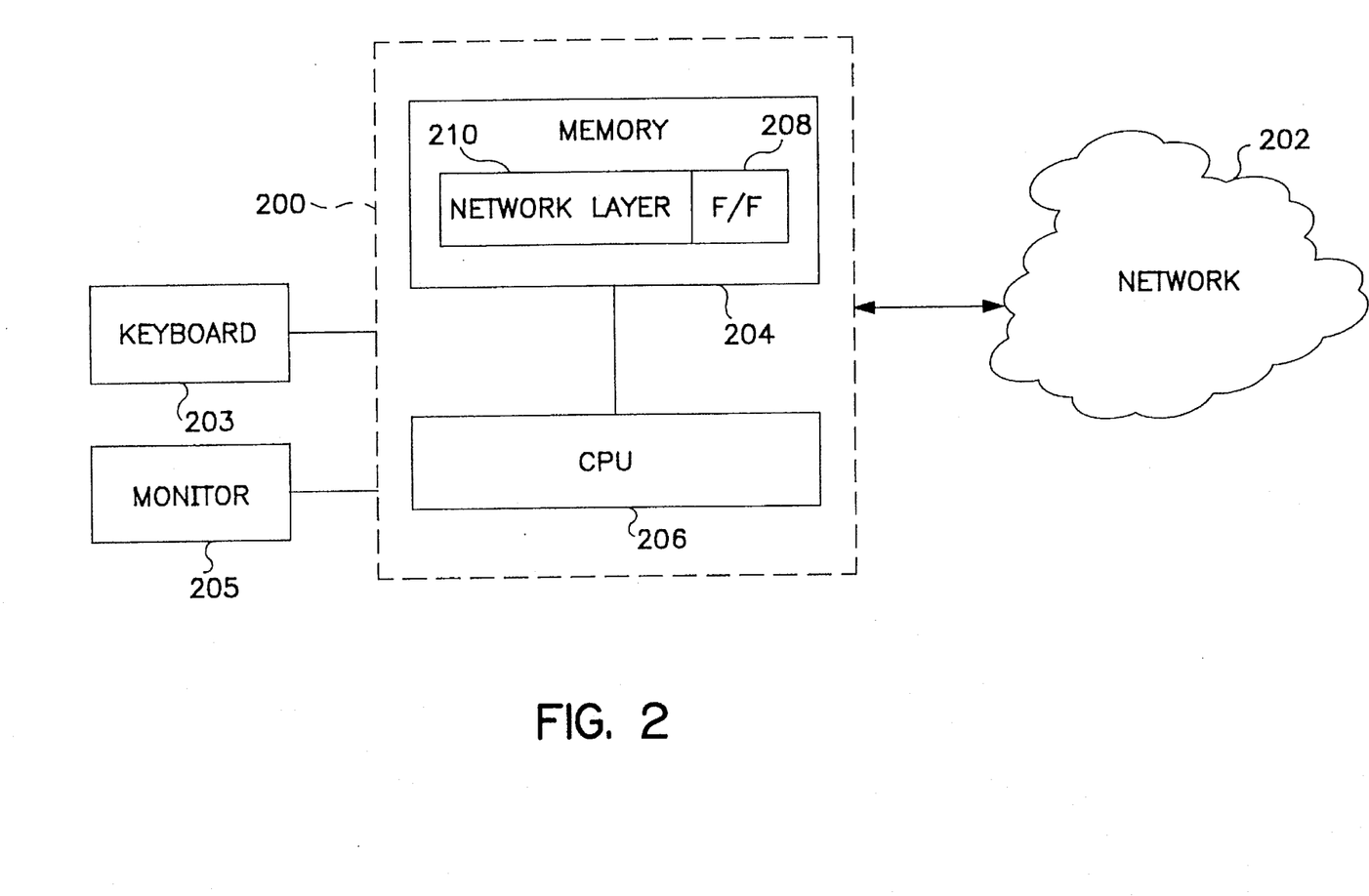
FIG. 2 illustrates an exemplary distributed system which may be implemented with the method and apparatus of the present invention.

FIG. 2 illustrates an exemplary distributed system which may be implemented with the method and apparatus of the present invention. A distributed system is a collection of systems in a network. Network 202 may represent more than one network. Personal computer (PC) or workstation 200 is an example of a system in network 202. PC or workstation 200 has memory 204 coupled to CPU 206. PC or workstation 200 is capable of being coupled to various peripheral devices, including keyboard 203 and monitor 205. PC or workstation 200 is coupled to network 202 in order to participate in the distributed system to obtain service from network servers or to offer services to network clients including other PC's and systems in the network. Memory 204 includes network layer 210 and fast-fail mechanism 208.

Figure 3A:
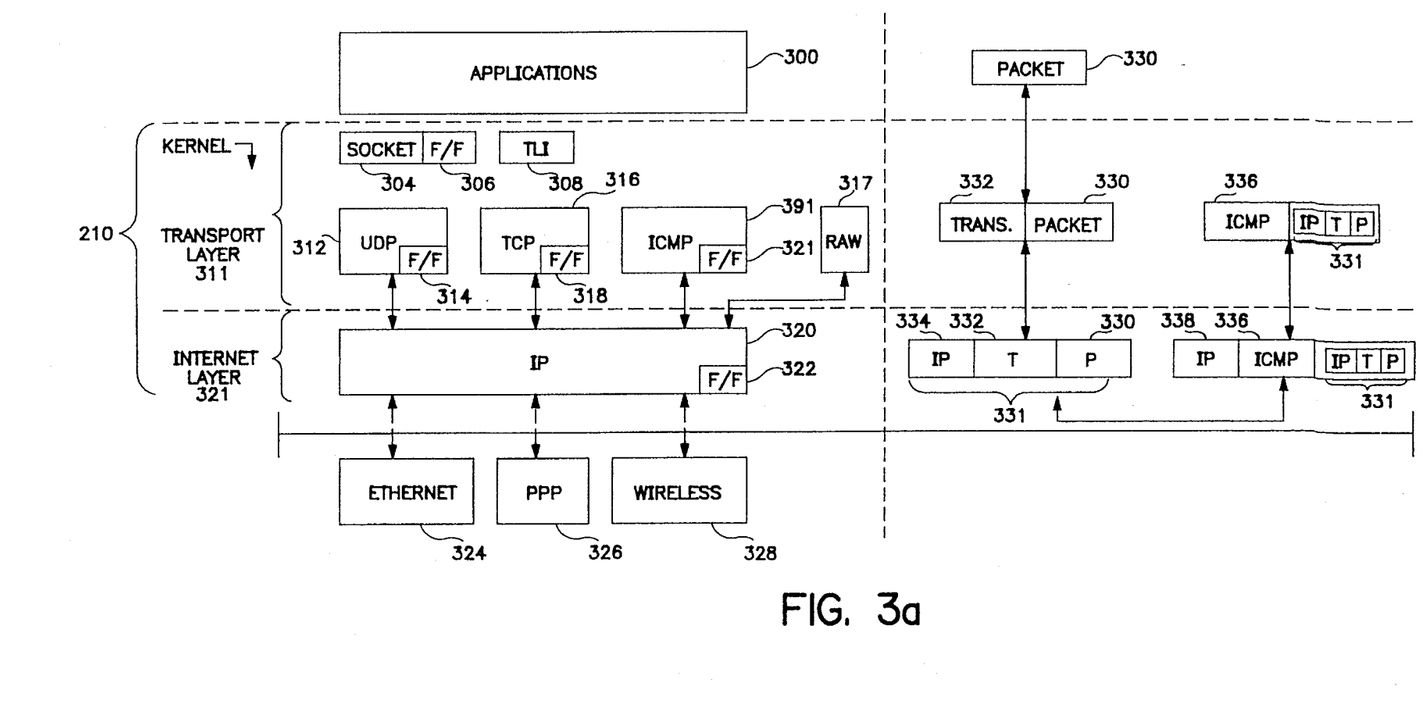
FIG. 3a illustrates network layer 210 residing in memory 204 with the implementation of the method and apparatus of the present invention.

FIG. 3a illustrates networking layer 210 residing in memory 204 with the implementation of the method and apparatus of the present invention. Applications 300 are conventional applications which run on PC or workstation 200 and reside in memory 204. Fast-fail mechanism 208 illustrated in FIG. 2 is broken down into sub-parts in FIG. 3a (e.g. IP fast-fail portion 322, UDP fast-fail portion 314, etc.). Network layer 210 has transport layer 311 and internet layer 321. Transport layer 311 has UDP (User Datagram Protocol) 312 with UDP fast-fail portion 314, TCP (Transmission Control Protocol) 316 with TCP fast-fail portion 318 and ICMP (Internet Control Message Protocol) 319 with ICMP fast-fail portion 321. UDP fast-fail 314 and TCP fast-fail 318 translate ICMP error into a Unix type error, understood by Unix applications. RAW 317 allows a user to define the transport layer or to access IP directly.

Typically, applications 300 attempt to access IP 320 through UDP 312 or TCP 316. A packet transmitted from applications 300 is then enclosed in a UDP packet or a TCP packet, adding either a UDP header or a TCP header on the packet before the packet reaches IP 320. If a user does not want any UDP or TCP intervention, but would like the packet to reach IP 320 directly, then RAW 317 is utilized to bypass UDP 312 and TCP 316.

Transport layer 311 also has socket descriptor 304 (socket) with socket fast-fail portion 306 and TLI (Transport Layer Independent) descriptor 308 (TLI). Socket 304 and TLI 308 are API's (Application Program Interface).

In Internet layer 321, IP (Internet Protocol) 320 has IP fast-fail portion 322. Ethernet 324, PPP (Point-to-Point Protocol) 326, and wireless driver 328 are exemplary drivers allowing for data transmission between PC or workstation 200 and network 202.

The portion to the right of network layer 210 illustrates packet 330 as it is being transmitted across different portions of network layer 210 in memory 204. Packet 330 is combined with transport header 332 in transport layer 311. In internet layer 321, packet 330 and transport header 332 are combined with an IP header to produce packet 331. At this point, IP fast-fail 322 determines whether or not system isolation has been enabled, either explicitly through direct user input or implicitly caused when all interfaces to the network become unusable. IP fast-fail 322 also determines whether or not packet 331 is to be transmitted outside the system or is to be looped back on the loop-back interface for inter-process communication (IPC) from one application running on the system to another application running on the same system.

If the system isolation has been enabled and the packet is not for a loop-back interface, then IP fast-fail 322 composes an ICMP error report as well as a new IP header to packet 331. Thus packet 331 (made up of IP header 334, transport header 332 and packet 330) is first combined with an ICMP header to produce packet 336 with a fast-fail error message indicating that a system isolation has been enabled.

Once packet 331 is encapsulated by an ICMP error message (see ICMP header 336 combined with packet 331 in FIG. 3a). A new IP header 338 is then attached to packet 336 with an internal destination address. The internal destination routes the packet with the error message to kernel modules and/or applications which may benefit from receiving the error message. In addition, the new internal destination address prevents the packet from being transmitted outside the system and thus prevents an attempt by an internal application from interfacing with a network when no interfaces are available. The source address in the new IP header is for IP fast-fail 322 (i.e. the system's local fast-fail code). Applications 300 are unmodified applications which are not notified of the fast-fail mode. With the present invention, applications 300 receive an error and display a pre-determined message, thus applications 300 are coerced into a fast-fail behavior without actually being aware that they are in a fast-fail mode.

The method by which IP 320 composes error messages using ICMP 319 is well-known in the art. An existing error message number 8 "source host isolated" is chosen as one implementation of the present invention. The use of this error code has several advantages. First, at this time, this error code is very rarely used, if at all. It is considered obsolete and current internet routers are required not to generate this error code. Additionally, even if the error code were received by the networking modules in the networking layer, the error code would not be interpreted as an indication of system isolation unless the source address of the ICMP packet 336 corresponds to the address of the local system's fast-fail code.

For example, if the source address does not indicate that the package originated in the local fast-fail code, the error message generated is simply treated as being equivalent to a host unreachable, error code number 12, using ICMP 319. Otherwise, if the source address indicates that the packet is from the local fast-fail code, then an error message indicating that the network is down may be output to the user and/or routed to the application which generated the original packet for transmission outside the system.

Figure 3B:
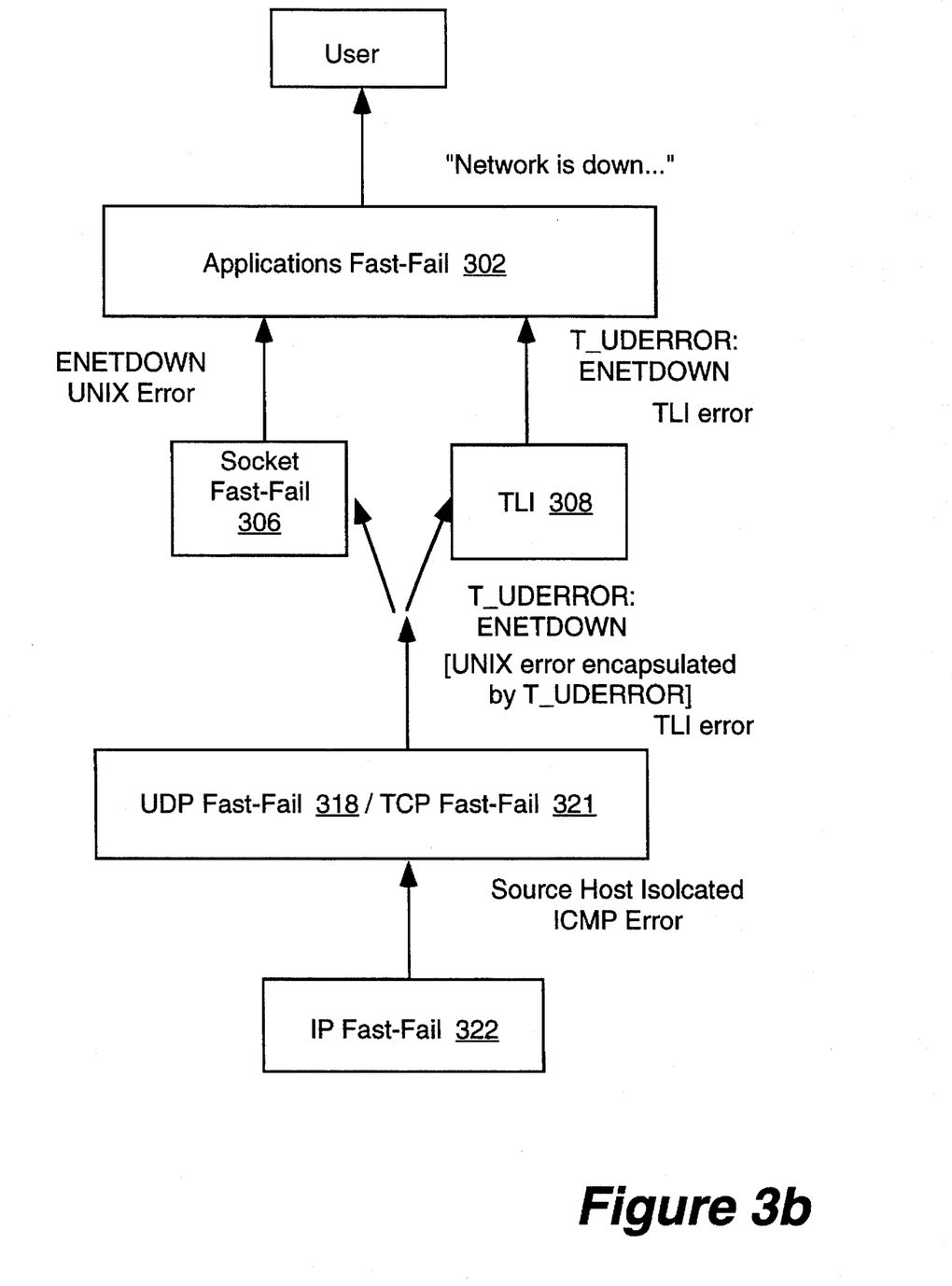
FIG. 3b is a data flow diagram illustrating the flow of data between the different levels of network layer 210.

FIG. 3b is a data flow diagram illustrating an exemplary flow of data between the different levels of network layer 210 showing exemplary error codes being transmitted between each level. IP fast-fail 322 begins the chain of events by creating and returning upstream an ICMP error message of "source host isolated". ICMP fast-fail 321 passes the ICMP error notification to the correct UDP or TCP stream. UDP fast-fail 314 and TCP 318 handle the notification by translating the ICMP error message 336 into a Unix error ENETDOWN for consumption by their clients, indicating that network is down. This Unix error may be encapsulated by a TLI message T_UDERROR for consumption by TLI 308.

TCP 316 has several options for handling the propagated isolation error. TCP fast-fail 318 provides TCP 316 the capability to allow a user to specify how TCP 316 should handle a fast-fail error indication. Using this option, TCP fast-fail 318 may disallow the fast-fail error from being propagated further upstream, it may allow the fast-fail error to propagate upstream by killing the TCP connection which caused the isolation error, or TCP fast-fail 318 may kill all TCP connections in the middle of transmitting data (i.e. not just terminating the connection which actually caused the isolation error). Depending upon the state of a user's selected option, TCP may record the ENETDOWN error to be returned when TCP 316 times-out or kills the connection. TCP 316 may do so by using the same function it typically causes to terminate time-out connections, but using the error of ENETDOWN. Given the method of the present invention, the implementation details of the three options provided to a user by TCP fast-fail 318 would be readily understood by a person skilled in the art.

Socket fast-fail 306 handles a UDP generated TLI message T_UDERROR encapsulating the Unix error of ENETDOWN by sending an error message up to the stream head. Socket fast-fail 306 only does so for connected sockets (i.e., those for which the source and destination information allow some sanity checks). The next access to socket 304 returns with an appropriate error code and the stream becomes unusable from this point on. A transport independent kernel module handles the UDP generated error by simply propagating the error upstream. Applications fast-fail 302 recognizes the fast-fail error indicating that network is down, such error may then be output to the user for his or her viewing and the network-related operation which initiated the transmission of the original data packet is made to fail.

Figure 3C:
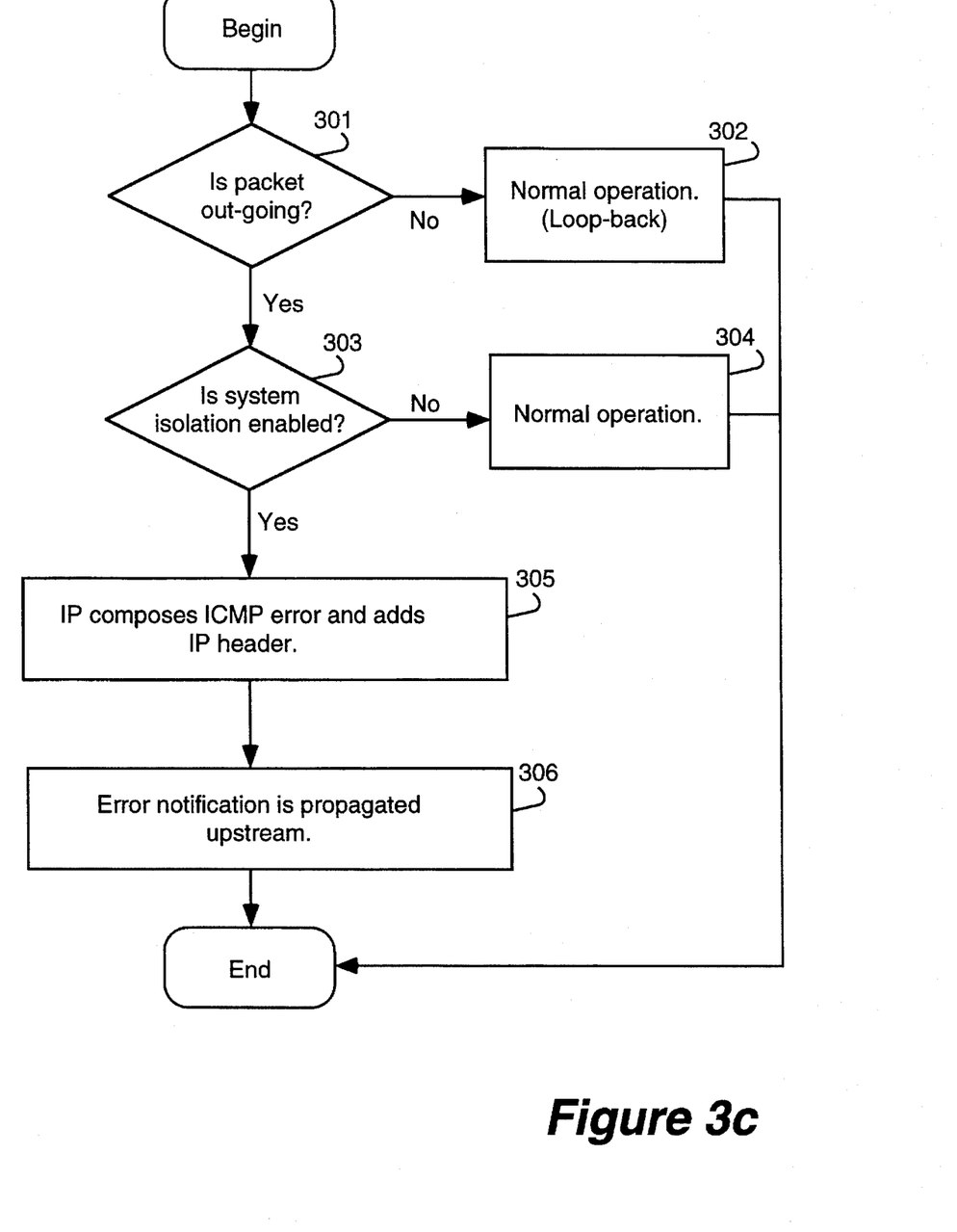
FIG. 3c is a flow diagram illustrating the general steps followed by the method and apparatus of the present invention.

FIG. 3c is a flow diagram illustrating the general steps followed by the method and apparatus of the present invention. In step 301, IP fast-fail 322 determines whether or not a packet generated is outgoing. If the generated packet is not outgoing, then it is a loop-back interface and normal operation is continued in step 301. Otherwise, in step 303, IP fast-fail 322 determines whether or not system isolation has been enabled, either explicitly through direct user input, or implicitly. In the implicit case, IP fast-fail 322 determines that system isolation exists when no network interfaces are available and the connection to the network is down.

If system isolation has not been enabled and the packet is outgoing, then in step 304, normal operation continues with the packet being transmitted out of the system. Otherwise, in step 305, IP 322 composes an ICMP error indicating that the network is down as well as an IP header with a source address of IP fast-fail 322 and a destination address of the original source address (i.e. address of the source which generated the original packet). In step 306, the ICMP error is propagated out of the stream back to the source which originally generated the packet. Propagation of the packet between the applications 300 and IP 320 through the transport layer (e.g., UDP 312 and TCP 316) is described in more detail in the description accompanying the flow diagrams in FIGS. 4a, 4b, 5a and 5b below.

FIGS. 4a and 4b, and FIGS. 5a and 5b, are flow diagrams illustrating the general steps followed when programming interfaces TLI 308 (FIGS. 4a and 4b) or socket 304 (FIGS. 5a and 5b) is used subsequent to a system isolation.

Application 300 is able to access IP 320 either through socket descriptor 304 or TLI file descriptor 308. Further, application 300 is able to receive the system isolation error through the standard error reporting facility supported by the transport layer (e.g., UDP 312 and TCP 316). Typically, when an application transmits a packet to network 202, a library or system call completes successfully at the stream head. The data generated is then forwarded down the stream. Therefore, applications 300's transmit operation and the IP 322's error reporting operation are asynchronous events.

The next time application 300 attempts to access socket descriptor 304 or TLI file descriptor 308, application 300 is notified of the isolated condition. Application 300 may then fail the network-related operation being attempted with an appropriate error message. In most other cases, however, application 300 receives the system isolation indication prior to attempting a data transfer. This is due to the fact that application 300 typically uses NIS (Network Information Service) or DNS (Domain Name System) for name resolution. These detect the system isolation and return an appropriate error to the calling program in application 300. If an application uses ICMP directly without the interventions of socket descriptor 304 or TLI file descriptor 308, then the application receives the ICMP packet 336 generated and is notified of the isolation condition.

Figure 4A:
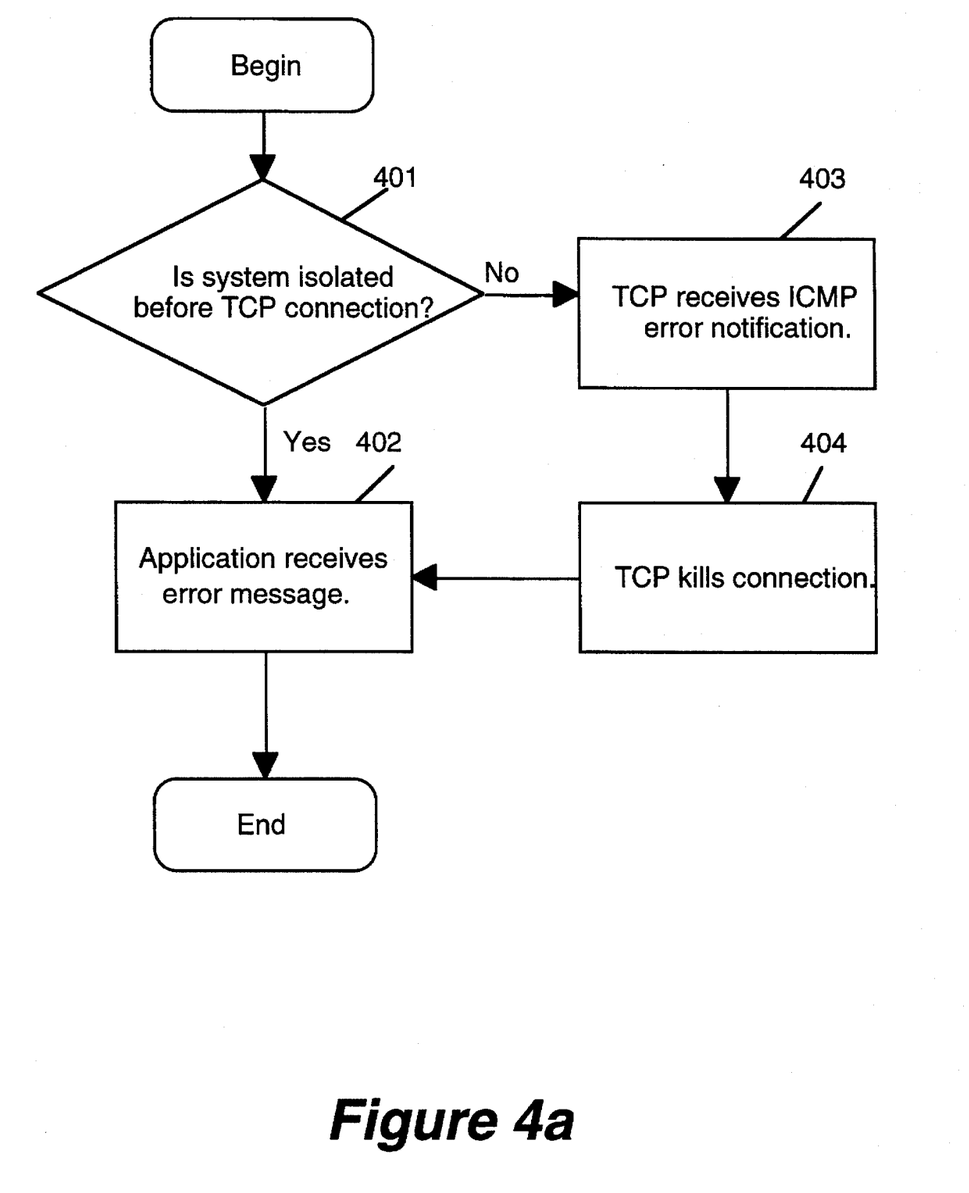
FIG. 4a illustrates application 300 attempting to access IP 320 through a TLI - TCP 316 connection.
Figure 4B:
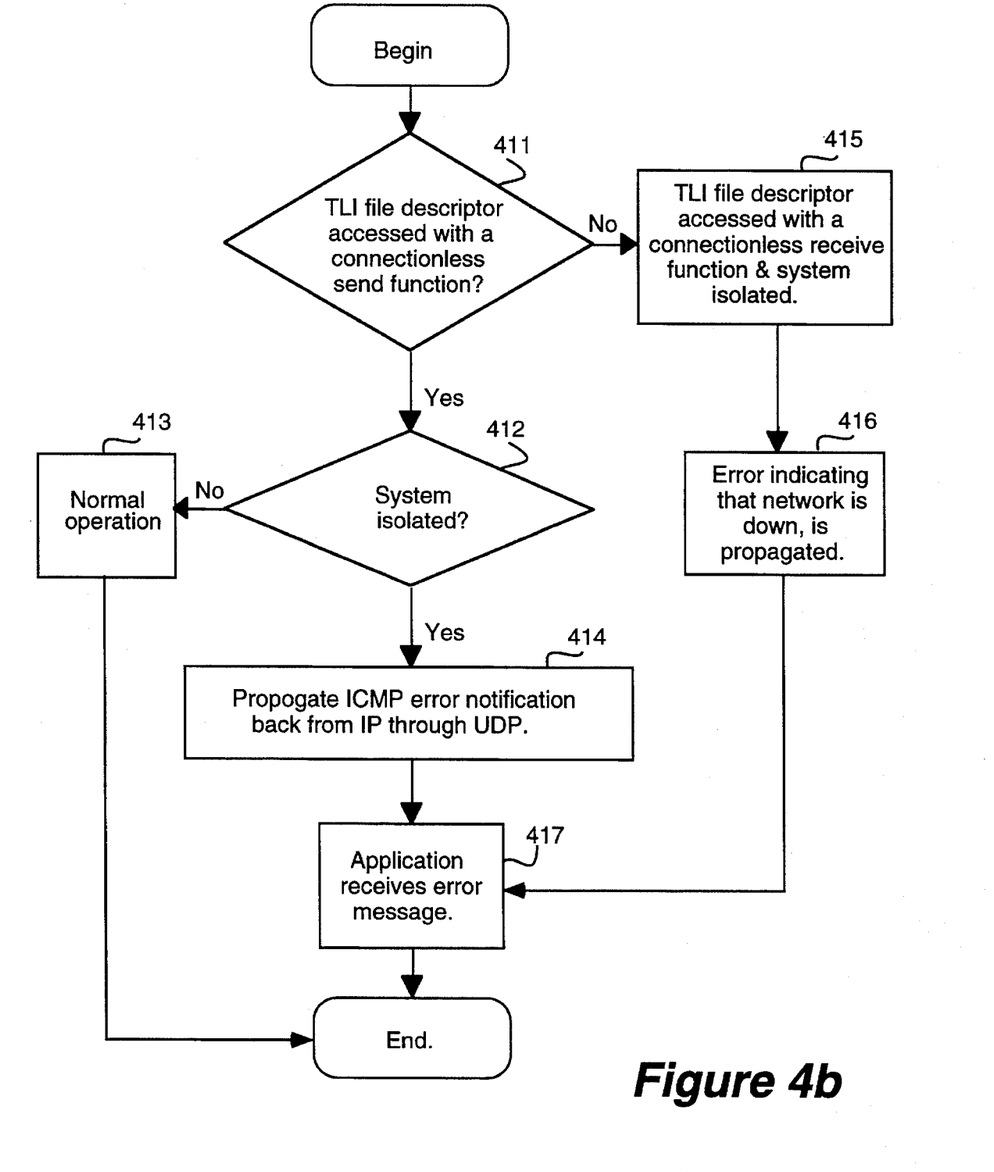
FIG. 4b illustrates the case where applications 300 attempt access to IP 320 through a TLI - UDP 312 connection.

The general steps followed in a system isolation case when application 300 attempts to access IP 320 through TLI file descriptor 308 are illustrated in FIGS. 4a and 4b.

FIG. 4a illustrates application 300 attempting to access IP 320 through a TLI - TCP 316 connection. In step 401, it is determined whether or not a system is isolated before a TCP connection is established. If the TCP connection has not been established and the system is already isolated, then in step 402, application 300 attempting access to IP 320 receives an error message, indicating that the network is down. Otherwise, if a TCP connection is already established, then in step 403, TCP 316 receives an ICMP error notification indicating that network is down. In step 404, the TCP connection established is disconnected. Finally, in step 402, application 300 attempting access to IP 320 receives an error message indicating that the network is down.

FIG. 4b illustrates the case where applications 300 attempt to access IP 320 through a TLI - UDP 312 connection. In step 411, if TLI file descriptor 308 is accessed with a connectionless send function and in step 412, if the system is isolated, then in step 414, an ICMP error notification is propagated back from IP 320 through UDP 312. If TLI file descriptor 308 is accessed with a connectionless send function but the system is not isolated, then in step 413, normal operation continues. If TLI file descriptor 308 is accessed with a connectionless receive function and the system is isolated in step 415, then in step 416, an error indicating that the network is down is propagated upstream. In step 417, application 300 receives the error message to be output to the user.

Figure 5A:
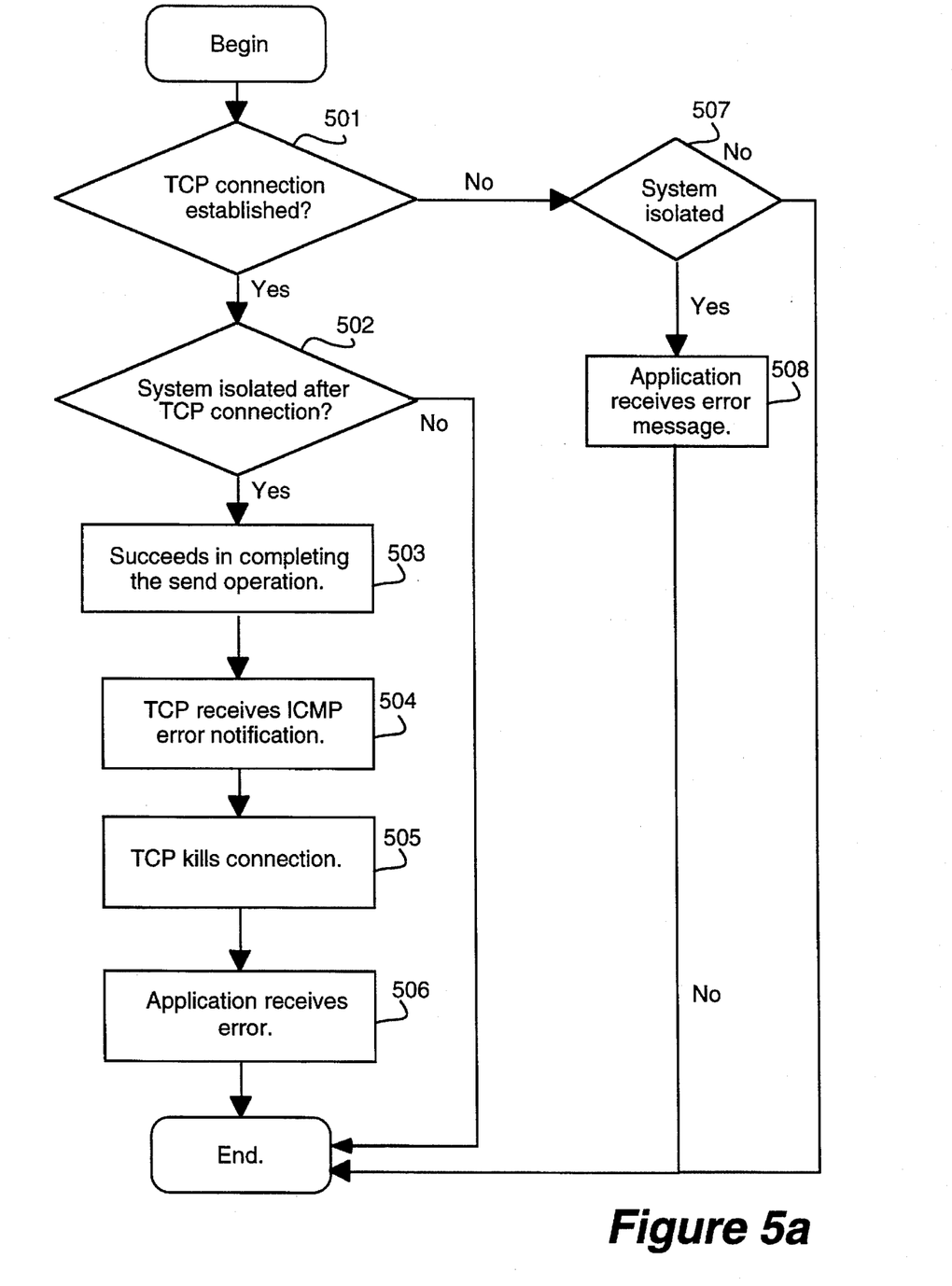
FIGS. 5a and 5b are flow diagrams illustrating the general steps followed when application 300 attempts access to IP 320 through socket descriptor 304.
Figure 5B:
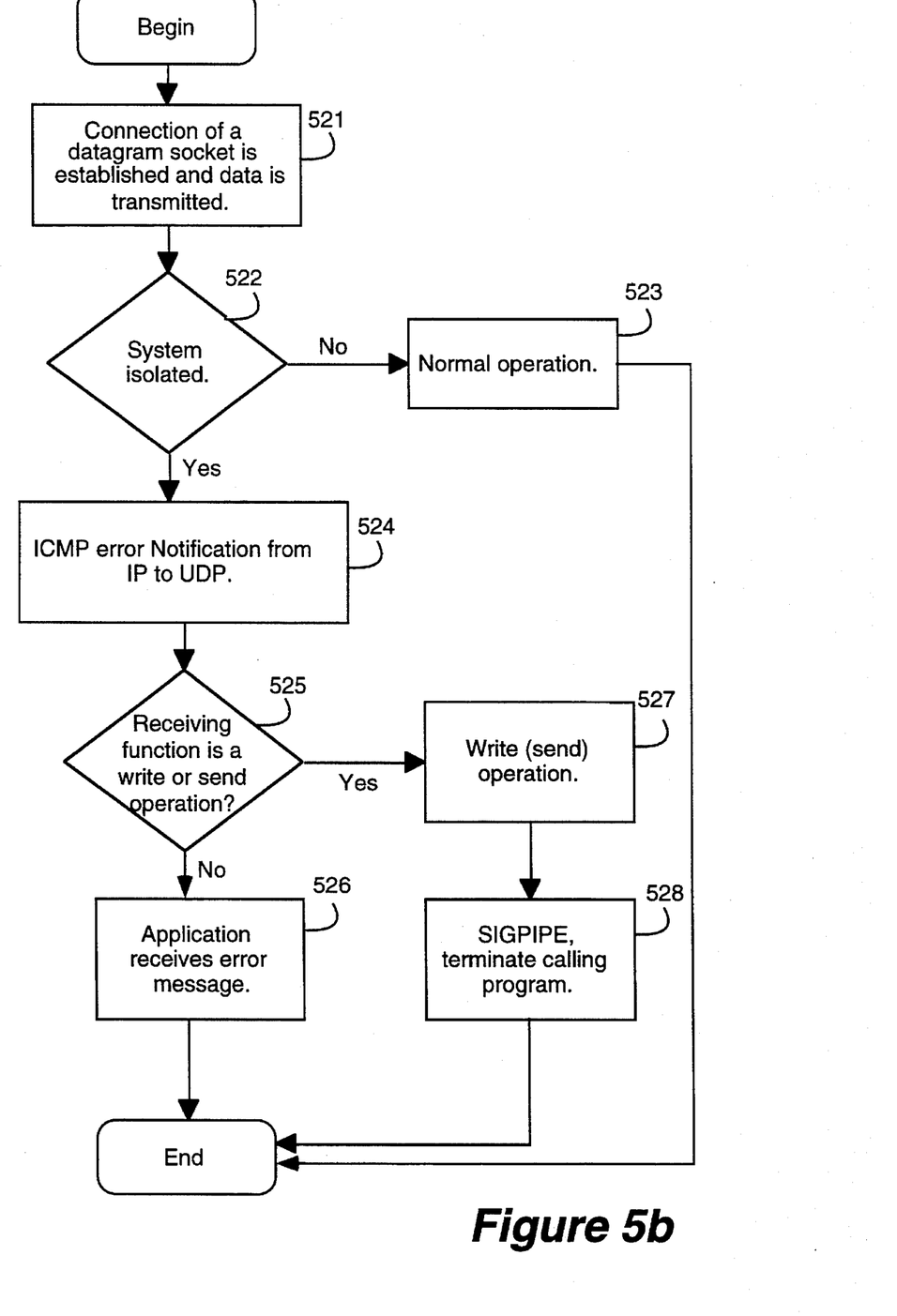

FIGS. 5a and 5b are flow diagrams illustrating the general steps followed when application 300 attempts an access to IP 320 through socket descriptor 304. As mentioned earlier, the network isolation error is encountered after an application sends or transmits a packet through the network and after such send or transmit operation has completed successfully. Socket descriptor 304 returns such asynchronous errors as a result of subsequent operations on the socket.

FIG. 5a illustrates the general steps followed in a socket - TCP case. In step 501, if a TCP connection is established and in step 502, if the system is isolated after the TCP connection, then in step 503, application 300 attempting a send type operation (e.g. send, write, etc.) succeeds in completing the send type operation. In step 504, TCP receives an ICMP error notification. In step 505, TCP kills the connection initiated by application 300 attempting a send type operation. In step 506, as a result of a subsequent network operation, the application receives an error message indicating that the network is down. If a TCP connection has not been established and the system is isolated in step 507, then the application receives an error message indicating that the network is down in step 508.

Back in step 504, instead of reading or receiving, if application 300 attempts another send type operation (e.g.

send, write), a signal SIGPIPE is generated. By default, the calling program is terminated. SIGPIPE is a signal generated by Unix whenever a process writes to a pipe or FIFO, and no processes are reading from the pipe or FIFO. Additionally, it is generated when a process writes to a socket that has become disconnected. The default action of this signal is to terminate the process that generated the write operation.

FIG. 5b is a flow diagram illustrating the general steps followed in the case of applications 300 attempting to access IP 320 through socket- UDP 312. There is no information to match unconnected UDP sockets 304 with incoming error notifications. Thus, it is not desirable to fast-fail applications which use unconnected UDP sockets 304. Connecting the datagram packet involves nothing more than local caching of some information. Since there is no exchange with the target system, this step always succeeds. Application 300 transmits data on a datagram socket via a write, send or any other functions allowing for transmission of data packets. Even if the system is isolated, these functions succeed. If an ICMP error notification is caused, it is propagated back from IP 320 through UDP 312 in the socket descriptor 304. This error is accessed via any receive function, such as a read function.

More specifically, in step 521, a connection of a datagram socket is established. In step 522, ff the system is not isolated, then in step 523 normal operation continues. Otherwise, in step 524, if the system is isolated, as a result of data transmission, an ICMP error notification is propagated from IP 320 to UDP 312. At the next attempt of a read or receive function by application 300, in step 522, application 300 receives an error message indicating that network is down, which is then output to the user for his or her viewing. If, instead of reading or receiving, application 300 attempts another write or send operation, in step 527 and step 528, a SIGPIPE signal is generated by default. SIGPIPE terminates the calling program in step 528.

In the alternate embodiment to avoid termination caused by SIGPIPE, where socket descriptor 304 is used for both TCP and UDP cases (i.e. FIGS. 5a and 5b cases), whether a system has been isolated or not may be determined before any TCP or UDP connection is established. In this way, rather than defaulting into automatically terminating a calling program, an error message may be transmitted back to the calling program for user viewing.

Figure 6:
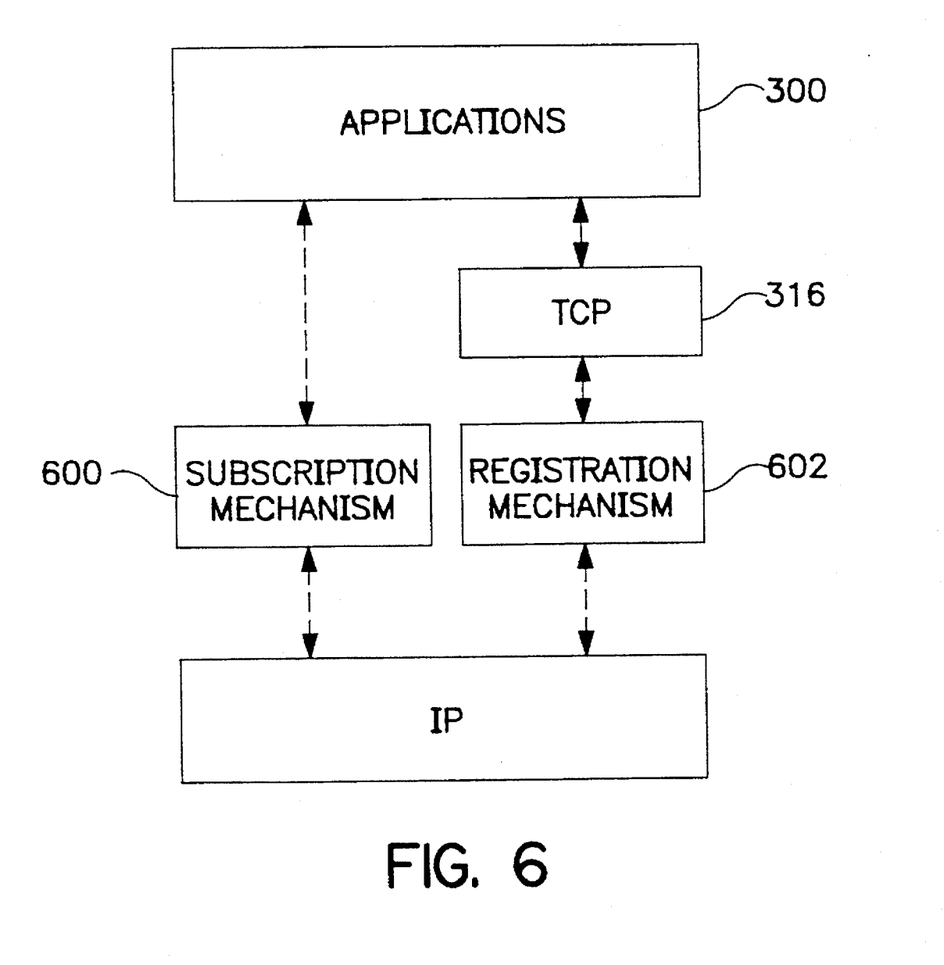
FIG. 6 illustrates an embodiment of the present invention with subscription and registration mechanisms for the efficient transmission of system isolation messages between the networking layers.

FIG. 6 illustrates an embodiment of the present invention with subscription and registration mechanisms for the efficient transmission of system isolation messages between the network layers 210. Applications 300 may wish to be notified whenever the system isolation status changes. Accordingly, subscription mechanism 600 allows applications 300 to receive immediate notification whenever IP 320's connectivity changes.

Registration mechanism 602 allows kernel modules to register a call back function with IP 320. When IP 320 senses a change in isolation status, it invokes the registered function. A user-selectable option employing this facility allows TCP 316 modules to abort all connections in the process of transmitting data.

Subscription mechanism 600 and registration mechanism 602 provide a framework for lower layers of network layers 210 to notify upper layer protocols and applications, of changing network conditions. For example, a cellular handoff notification may be used by TCP 316 to "kick" its fast retransmit code. An example of a good candidate for notification is the amount of bandwidth available. Each layer may use this information to decide if it is worth offering service. For example, if the bandwidth available is 2400 bps, TCP 316 and UDP 312 may still offer service, however NFS (Network File System) 309 may just return an error. In effect, this allows the specification of minimum conditions for each type of network connection.

Figure 7:
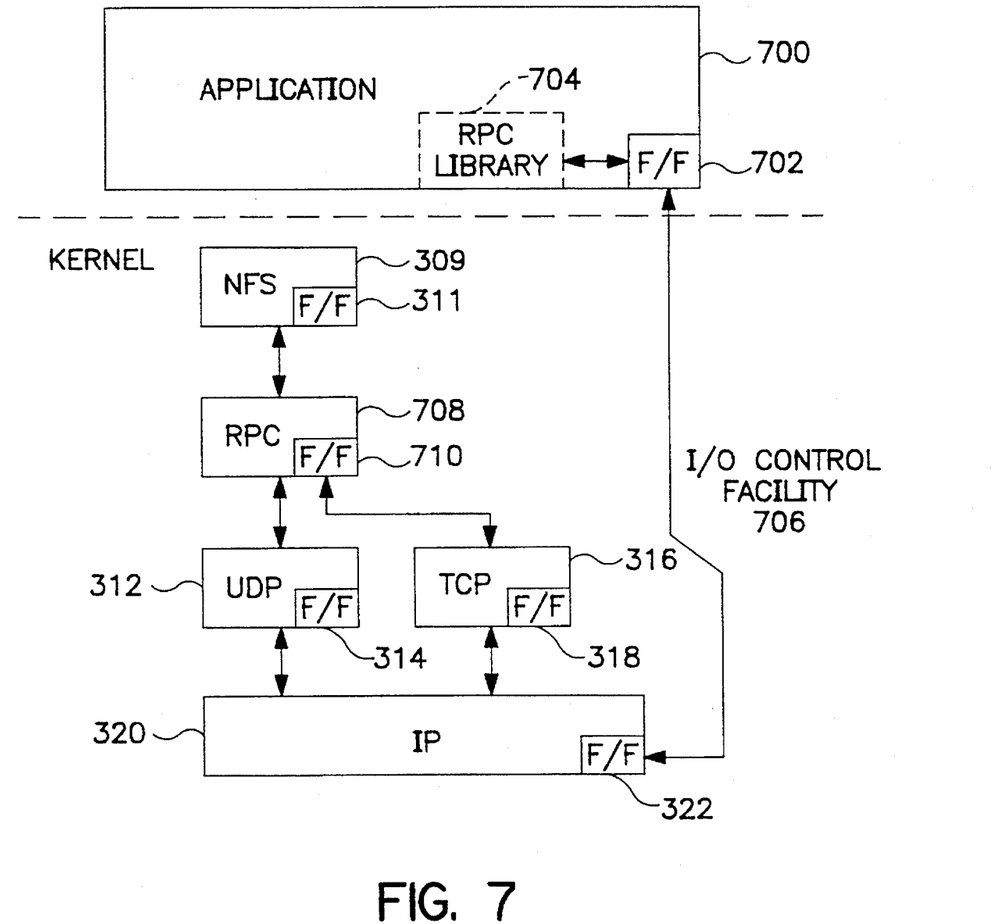
FIG. 7 illustrates an alternative embodiment of the present invention, allowing for applications to communicate to IP through remote procedure calls (RPC).

FIG. 7 illustrates an alternative embodiment of the present invention, allowing for application 700 to communicate to IP 320 through remote procedure calls (RPC). RPC in this embodiment exists as both a kernel module 708 and an application layer library 704. Once an error notification is propagated up to RPC 708, RPC 708 translates the message into one which is understandable to RPC clients. For example, RPC 708 may translate a received message to an RPC "can't send" message which is a type of error message understandable by RPC clients. At NFS (Network File System) 309, the RPC "can't send" message causes an NFS operation to fast-fail by passing the Unix error ENETDOWN ("network is down") to the user.

In one embodiment, RPC 704 receives the ICMP error notification directly from IP fast fail 322 via application fast fail 702. This may be implemented by defining new set of I/O CTL (control) mechanisms 706. The method by which to define new I/O CTL would be readily understood by a person skilled in the art. When the error notification is received, RPC 704 translates the message into an RPC error message, such as to an RPC "can't send". Other applications which would benefit from receiving the error notification directly from IP fast fail 322 may be implemented with application fast fail 702 to allow those applications to recognize an error message generated at the IP layer and to translate it into an error message understandable to its clients. Given the isolation information, application 700 may, among other functions, be able to avoid further network operations, determine when to use a cache and to cut short a time-out period.

In another embodiment, application 700 may be a special tool allowing for a user to enable system isolation through direct user input or to check on the isolation status. As described above, new sets of I/O CTL (control) mechanisms are defined to facilitate the communication between IP fast-fail 322 and application 700.

What has been described is a method and apparatus which allows systems connected to a network to continue to function in a diminished capacity even when the network is disconnected. The embodiment described herein utilizes an ICMP code to provide a fast-fail capability, allowing unmodified applications to fail quickly when a network connection is not available. The present invention allows for applications and kernel modules to pro-actively handle system isolation by registering for and receiving notification as soon as system conditions change.

While certain exemplary embodiments have been described in detail and shown in the accompanying drawings, it is to be understood that such embodiments are merely illustrative of and not restrictive on the broad invention, and that this invention is not to be limited to the specific arrangements and constructions shown and described, since various other modifications may occur to those with ordinary skill in the art.

What is claimed:

1. A method for allowing a system interfaced to a network to have continued functionality even when a network connection is not available, said method comprising the steps of:

determining if a packet generated by an application running on said system is out-going and addressed to said network, and if a system isolation has been enabled; and propagating an error notification indicating that system isolation has been enabled if said packet is out-going and said system isolation has been enabled, said error notification being propagated upstream and originating as an error message composed by said system's internet protocol layer.

2. The method of claim 1 wherein said system isolation is enabled by direct user input on said system.

3. The method of claim 1 wherein said system isolation is enabled automatically when said internet protocol layer detects that no network interface is available to said system.

4. The method of claim 1 wherein said network system's interface involves transmission of a packet to said network from said system, said packet generated by said application.

5. The method of claim 4 further comprising the step of adding said error message to said packet.

6. The method of claim 4 further comprising the step of adding a header to said packet.

7. The method of claim 4 wherein said error message being composed of an ICMP error message.

8. The method of claim 1 wherein said step of propagating further comprises the step of composing an error message.

9. The method of claim 1 wherein said step of propagating further comprises the step of translating said error message to a new error message understandable by a client of each network layer in the system's kernel, said error message being translated at each layer as said error message is being transmitted upstream.

10. The method of claim 1 wherein said applications comprises an isolation aware application running on said system, said isolation aware application being able to communicate directly with said internet protocol layer.

11. A method for allowing a system interfaced to a network to have continued functionality even when a network connection is not available, said method comprising the steps of:

determining if a system isolation has been enabled and an application on said system has initiated a network-related operation, said determining step being performed by said system's internet protocol layer which performs said determining if said system isolation has been enabled, by detecting direct user input requesting system isolation and detecting when all network interfaces are unavailable; and propagating a system isolation error message originating from an error message to a plurality of networking kernel modules coupled to said internet protocol layer, if it is determined that said system is isolated and said network related operation has been initiated.

12. An apparatus for allowing a system interfaced with a network to continue functioning even when said system is disconnected from said network, said apparatus comprising:

a memory containing a network layer allowing said system to communicate with said network, said network layer containing, an internet protocol fast-fail mechanism for determining if system isolation has been enabled and if a network related operation has been initiated, said internet protocol fast-fail mechanism composing an error message indicating that said system is in fast-fail mode if it is determined that said system isolation has been enabled and said network related operation has been initiated; and a processor coupled to said memory, said processor for running said internet protocol fast-fail mechanism.

13. The apparatus of claim 12 wherein said error message composed by said internet protocol fast-fail mechanism is transmitted upstream through said network layer of said system to a source which initiated said network related operation.

14. The apparatus of claim 12 wherein said network layer comprises a UDP fast-fail mechanism for recognizing said error message from said internet protocol fast-fail mechanism, said UDP fast-fail mechanism translates said error message into a new error message understandable by its client and transmits said new error message to said client.

15. The apparatus of claim 12 wherein said network layer comprises a TCP fast-fail mechanism for recognizing said error message from said internet protocol fast-fail mechanism, said TCP fast-fail mechanism having the options to disallow fast-fail, allow fast-fail by killing the connection causing the fast-fail or kill all connections, said TCP fast-fail may also translate said error message into a new error message understandable by its client and transmit said new error message to said client.

16. The apparatus of claim 12 wherein said memory further comprises an application initiating said network related operation.

17. The apparatus of claim 16 wherein said application further comprises an application fast-fail mechanism allowing said application to recognize an error message indicating that said system is in said fast-fail mode.

18. The apparatus of claim 17 wherein said system further comprises a display device allowing said application to display an application error message indicating that system is in said fast-fail mode.

19. A system interfaced with a network, said system capable of continuing to function even when said system is disconnected from said network, said system comprising:

a memory containing a network layer allowing said system to communicate with said network, said network layer containing, an internet protocol fast-fail mechanism for determining if system isolation has been enabled and if a network related operation has been initiated, said internet protocol fast-fail mechanism composing an error message indicating that said system is in fast-fail mode if it is determined that said system isolation has been enabled and said network related operation has been initiated; and a processor coupled to said memory, said processor for running said internet protocol fast-fail mechanism.

20. The system of claim 19 wherein said error message composed by said internet protocol fast-fail mechanism is transmitted upstream through said network layer of said system to a source which initiated said network related operation.

21. The system of claim 19 wherein said network layer comprises a UDP fast-fail mechanism for recognizing said error message from said internet protocol fast-fail mechanism, said UDP fast-fail mechanism translates said error message into a new error message understandable by its client and transmits said new error message to said client.

22. The system of claim 19 wherein said network layer comprises a TCP fast-fail mechanism for recognizing said error message from said internet protocol fast-fail mechanism, said TCP fast-fail mechanism translates said error message into a new error message understandable by its client and transmits said new error message to said client.

23. The system of claim 19 wherein said memory further comprises an application initiating said network related operation.

24. The system of claim 23 wherein said application further comprises an application fast-fail mechanism allowing said application to recognize an error message indicating that said system is in said fast-fail mode.

25. The system of claim 24 wherein said system further comprises a display device allowing said application to display an application error message indicating that system is in said fast-fail mode.

* * * * *